US011814066B2

(12) United States Patent
Murayama et al.

(10) Patent No.: US 11,814,066 B2
(45) Date of Patent: Nov. 14, 2023

(54) DRIVING SUPPORT DEVICE

(71) Applicant: HONDA MOTOR CO., LTD., Tokyo (JP)

(72) Inventors: Yuki Murayama, Saitama (JP); Takashi Nishioka, Saitama (JP); Masayuki Sato, Saitama (JP); Tomoko Nishino, Saitama (JP); Kazuasa Suzuki, Saitama (JP); Yuya Kishimoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/676,838

(22) Filed: Feb. 22, 2022

(65) Prior Publication Data
US 2022/0306141 A1    Sep. 29, 2022

(30) Foreign Application Priority Data

Mar. 29, 2021   (CN) .......................... 202110334954.6

(51) Int. Cl.
*H04N 5/44* (2011.01)
*B60W 50/14* (2020.01)

(52) U.S. Cl.
CPC ....... *B60W 50/14* (2013.01); *B60W 2050/143* (2013.01); *B60W 2554/00* (2020.02); *B60W 2554/40* (2020.02)

(58) Field of Classification Search
CPC ........... B60W 50/14; B60W 2050/143; B60W 2554/40; B60W 2554/80
See application file for complete search history.

(56) References Cited

U.S. PATENT DOCUMENTS

| 11,260,792 | B1* | 3/2022 | Lee | .................. B60Q 5/008 |
| 2003/0156019 | A1* | 8/2003 | Lehmann | .............. G01S 13/931 340/691.2 |
| 2019/0052967 | A1* | 2/2019 | Kim | .................. H04R 1/403 |
| 2022/0108675 | A1* | 4/2022 | Brockwell | ............... G10H 1/46 |

FOREIGN PATENT DOCUMENTS

| JP | 2014025780 A | * | 2/2014 |
| JP | 2019061480 A | | 4/2019 |

* cited by examiner

*Primary Examiner* — Munear T Akki
(74) *Attorney, Agent, or Firm* — CKC & Partners Co., LLC

(57) ABSTRACT

Provided is a driving support device which can perform an effective warning to occupants of the vehicle in order to avoid collision between one's own vehicle and another vehicle. A driving support device 11 includes: an acoustic device 91; an outside-world information acquisition unit 40; a relative distance measurement unit 201 which measures the relative distance from another vehicle 300 traveling ahead of the vehicle 1 based on the outside-world information acquired by the outside-world information acquisition unit 40; and a music control unit 202 which control music outputted by an acoustic device 91, in which the music control unit 202 modulates the tone of music according to the relative distance, in the case of the relative distance becoming no more than a first predetermined distance D1, in a state of outputting music by the acoustic device 91.

4 Claims, 7 Drawing Sheets

DRIVING SUPPORT DEVICE

This application is based on and claims the benefit of priority from Chinese Patent Application No. CN202110334954.6, filed on 29 Mar. 2021, the content of which is incorporated herein by reference.

BACKGROUND OF THE INVENTION

Field of the Invention

The present invention relates to a driving support device.

Related Art

Conventionally, a driving support device has been disclosed which sets a continuous driving time based on a drowsiness risk and monotonous driving risk, and increases the volume of the car stereo in order to perform warning to the occupants of a vehicle based on the continuous driving time (for example, refer to Patent Document 1).
Patent Document 1: Japanese Unexamined Patent Application, Publication No. 2019-61480

SUMMARY OF THE INVENTION

However, in the case of increasing the volume of the car stereo in order to warn the occupants of a vehicle, although the intention of the warning tends to be transmitted to the occupants, there is concern over the occupants depending on the warning. In addition, in the case of the volume of a car stereo increasing, there is a possibility of the occupants feeling uncomfortable. On the other hand, in the case of the inter-vehicle distance between one's own vehicle and another vehicle becoming shorter, it is necessary to perform a warning to the occupant of the one vehicle in order to avoid collision between the one vehicle and other vehicle.

Therefore, the present invention has an object of providing a driving support device which can perform an effective warning to the occupant of a vehicle in order to avoid collision between the one vehicle and the other vehicle.

A driving support device (for example, the driving support device 11 described later) according to one aspect of the present disclosure includes: an acoustic unit (for example, the acoustic device 91 described later) equipped to a moving body (for example, the vehicle 1 described later), and capable of outputting music in response to an operation of an occupant of the moving body; an outside-world information acquisition unit (for example, the outside-world information acquisition unit 40 described later) which acquires outside-world information of surroundings of the moving body; a relative distance measurement unit (for example, the relative distance measurement unit 201 described later) which measures a relative distance from a front moving body (for example, the other vehicle 300 described later) traveling in front of the moving body, based on the outside-world information acquired by the outside-world information acquisition unit; and a music control unit (for example, the music control unit 202 described later) which controls the music outputted by the acoustic unit, in which the music control unit performs modulation of tone of the music according to the relative distance, in a case of the relative distance becoming no more than a first predetermined distance, in a state outputting music by the acoustic unit.

In addition, the modulation includes delaying rhythm of the music.

Furthermore, the music control unit, in a case of the relative distance becoming no more than a second predetermined distance, in a state of the music not being outputted by the acoustic unit, causes output of the music to start automatically in the acoustic unit, and causes volume to increase as approaching the first predetermined distance, and the second predetermined distance is longer than the first predetermined distance.

Moreover, the music control unit causes volume of the music to decrease according to the relative distance, in a case of the relative distance becoming no more than the first predetermined distance.

Additionally, the music control unit stops output of the music by the acoustic unit in a case of the relative distance becoming no more than a third predetermined distance, which is shorter than the first predetermined distance, and outputs a warning to the occupant.

According to the present invention, it is possible to provide a driving support device which can perform an effective warning to the occupant of a vehicle in order to avoid collision between the one's own vehicle and the other vehicle.

DETAILED DESCRIPTION OF THE INVENTION

Figure 1:
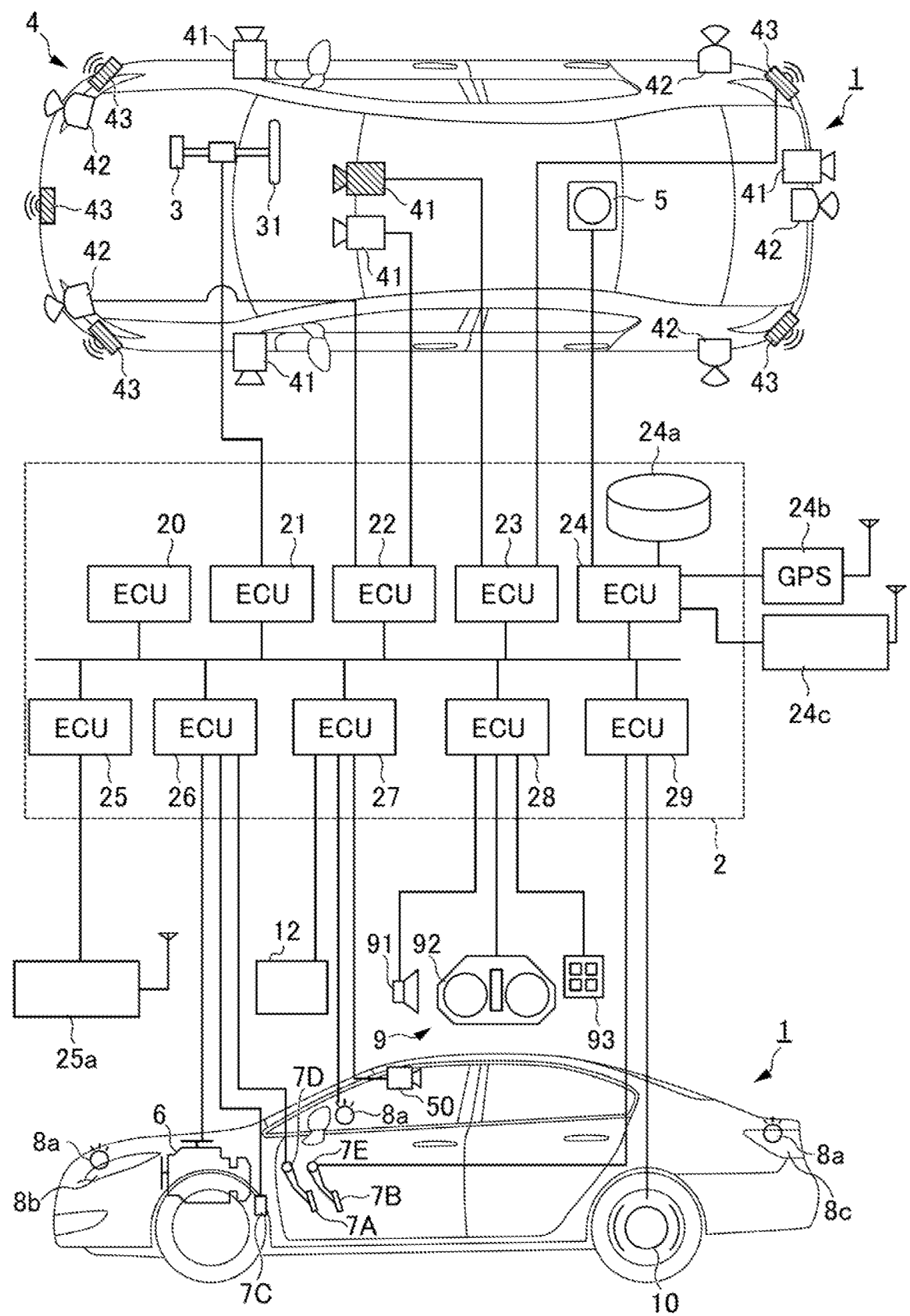
FIG. 1 is a block diagram showing the configuration of a vehicle according to the present embodiment.

Hereinafter, an embodiment of a driving support device of the present invention will be explained while referencing the drawings. FIG. 1 is a block diagram showing the configuration of a vehicle 1 according to the present embodiment. FIG. 1 shows an outline of the vehicle 1 by combining a plan view and a side view. The vehicle 1 is a four-wheeled occupant car of sedan type as one example.

The vehicle 1 includes a control device 2. The control device 2 includes a plurality of ECUs (automatic driving ECU 20~stop control ECU 29) connected to enable transmitting by way of an onboard network. Each ECU functions as a computer including a processor of which a CPU is representative, a storage device such as semiconductor memory, an interface such as an external device, etc. The program executed by a processor, and data used in processing by the processor, etc. are stored in the storage device. Each ECU may include a plurality of processors, storage devices, interfaces, etc.

Hereinafter, the function of each automatic driving ECU 20 to stop control ECU 29, etc. will be explained. It should be noted that the number of ECUs and corresponding functions can be set appropriately, and can be subdivided or integrated more than the ECUs shown in the present embodiment.

The automatic driving ECU 20 executes control for automatic driving of the vehicle 1. In automatic driving, at least one of steering of the vehicle 1, or acceleration and deceleration is automatically controlled.

A steering ECU 21 controls an electric power steering device 3. The electric power steering device 3 includes a mechanism which steers front wheels in response to a driving operation (steering operation) of the driver on a steering wheel 31. In addition, the electric power steering device 3 includes a motor which exerts a driving force for assisting a steering operation or automatically steering the front wheels; a sensor detecting the steering angle; etc. In the case of the driving state of the vehicle 1 being automatic driving, the steering ECU 21 automatically controls the electric power steering device 3 in response to the instruction from the automatic driving ECU 20, and controls the travel direction of the vehicle 1.

Travel support ECUs 22 and 23 perform control of a camera 41, LIDAR 42 and millimetric wave radar 43, which detect the ambient conditions of the vehicle, and information processing of detection results. The camera 41 images the front, sides and rear of the vehicle 1. In the case of the present embodiment, two of the cameras 41 are provided at the front of the vehicle 1, and one is provided to each side and the rear. The travel support ECUs 22 and 23 can extract an outline of a target, and extract dividing lines of lanes on a road (white lines, etc.), by analysis of the images captured by the camera 41.

The LIDAR 42 is Light Detection and Ranging (LIDAR), detects landmarks of the surroundings of the vehicle 1, and measures the distance from landmarks. In the case of the present embodiment, five LIDAR 42 are provided, one being provided to each corner at the front of the vehicle 1, one at the center in the rear, and one at each side in the rear.

The millimetric wave radar 43 detects landmarks of the surroundings of the vehicle 1, and measures the distance from the landmarks. In the case of the present embodiment, five millimetric wave radar 43 are provided, one being provided at the center in the front of the vehicle 1, one at each corner in the front, and one provided at each corner in the rear.

The travel support ECU 22 performs control of one camera 41 in the front of the vehicle 1 and each LIDAR 42, and information processing of detection results. The travel support ECU 23 performs control of another camera 41 in the front of the vehicle 1 and each millimetric wave radar 43, and information processing of detection results. It is possible to improve the reliability of detection results by equipping two groups of ECUs detecting the ambient conditions of the vehicle 1, and it is possible to perform multi-faceted analysis of the surrounding environment of the vehicle 1, by equipping detection units of different types such as the camera 41, LIDAR 42 and millimetric wave radar 43.

A position recognition ECU 24 performs controls of a gyro sensor 5, GPS sensor 24b and communication device 24c, and performs information processing of detection results or communication results. The gyro sensor 5 detects gyration of the vehicle 1. The position recognition ECU 24 can determine the route of the vehicle 1, according to the detection results of the gyro sensor 5, wheel speed, etc.

The GPS sensor 24b detects the current position of the vehicle 1. The communication device 24c performs wireless communication with a server that provides map information, traffic information, etc. The position recognition ECU 24 can access a database 24a of map information constructed in the storage device, and the position recognition ECU 24 performs route guidance from a current location to a destination, etc.

The communication control ECU 25 includes a communication device 25a for inter-vehicle communication. The communication device 25a performs wireless communication with other vehicles in the surroundings, and performs information exchange between vehicles.

The drive control ECU 26 controls a power plant 6. The power plant 6 is a mechanism which outputs driving force causing the drive wheels of the vehicle 1 to rotate, and includes an engine and transmission, for example. The drive control ECU 26, for example, controls the output of the engine in response to driving operation (acceleration operation or acceleration operation) of the driver detected by an operation detection sensor 7D provided to the accelerator pedal 7A. Then, the drive control ECU 26 switches the variable speed level of the transmission based on information of the vehicle speed, etc. detected by the vehicle speed sensor 7C. In the case of the driving state of the vehicle 1 being automatic driving, the drive control ECU 26 automatically controls the power plant 6 in response to the instruction from the automatic driving ECU 20, and controls acceleration/deceleration of the vehicle 1.

Figure 3:
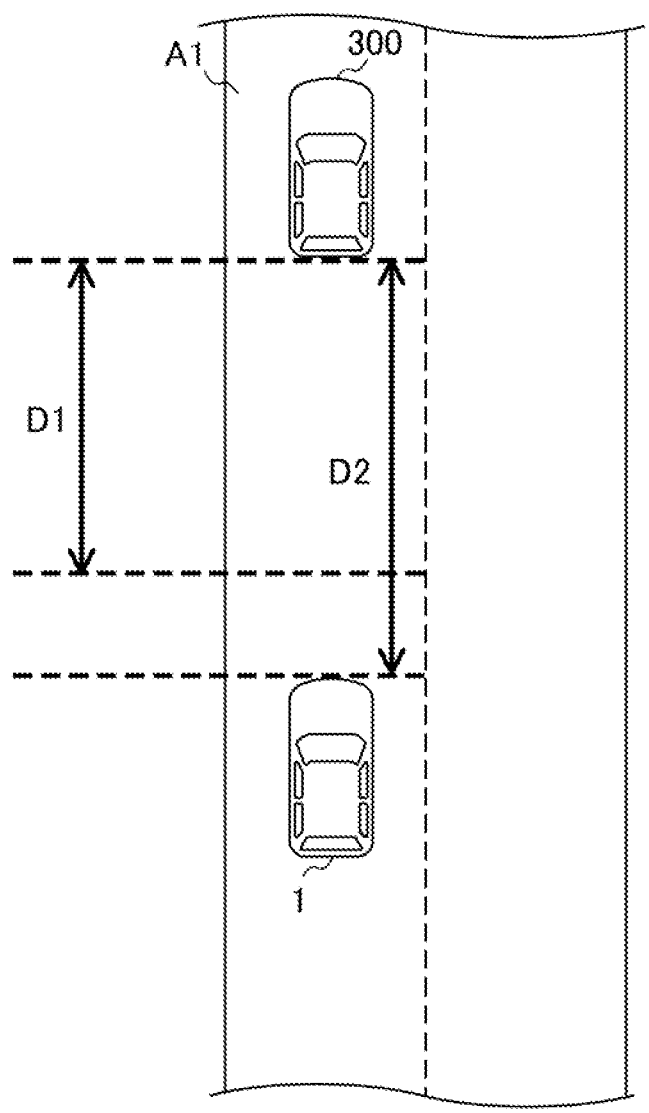
FIG. 3 is a view showing a relationship of relative distances between a vehicle and another vehicle.

A vehicle external notification control ECU 27 controls a lighting system 8 such as the directional indicators (winkers) 8a, the headlights 8b and tail lights 8c (refer to FIG. 3 described later). In the case of the example in FIG. 1, the directional indicators 8a are provided to the front of the vehicle 1, door mirrors and rear. The head lights 8b are provided to the front of the vehicle 1, and the tail lights 8c are provided to the rear of the vehicle 1.

A vehicle internal notification control ECU 28 performs control of an input/output device 9. The input/output device 9 performs output of information to the driver, and reception of inputs of information from the driver. The input/output device 9 has an acoustic device 91, display device 92 and input device 93.

The acoustic device 91 notifies information by outputting a voice to the driver. In addition, the acoustic device 91 outputs music or the like to the driver.

The display device 92 notifies information by the display of images to the driver. The display device 92 is arranged in front of the driver's seat, and configures an instrument panel, etc. It should be noted that although voice and display are exemplified herein, it may notify of information by vibration or light. In addition, the input/output device 9 may notify information by combining a plurality of voice, display, vibration or light. Furthermore, the input/output device 9 may differentiate the combinations according to the level of information to notify (for example, urgency), and differentiate the notification mode.

The input device 93 is arranged at a position allowing operation by the driver, and is a switch group for performing instruction to the vehicle 1; however, it may include a voice input device.

The stop control ECU 29 controls the brake device 10 and parking brake (not shown). The brake device 10 is a disc brake device, for example, is provided to each wheel of the vehicle 1, and causes the vehicle 1 to decelerate or stop by applying resistance to rotation of the wheels.

The stop control ECU 29, for example, controls operation of the brake device 10 in response to a driving operation (brake operation) of the driver detected by an operation detection sensor 7E provided to the brake pedal 7B. In the case of the driving state of the vehicle 1 being automatic driving, the stop control ECU 29 automatically controls the brake device 10 in response to instruction from the ECU 20, and controls deceleration and stopping of the vehicle 1. The brake device 10 and parking brake can operate in order to maintain the stopped state of the vehicle 1. In addition, in the case of the transmission of the power plant 6 including a parking lock mechanism, this parking lock mechanism can operate in order to maintain the stopped state of the vehicle 1.

The vehicle 1 further includes a vehicle interior detection sensor 50 for detecting the state of the vehicle interior. Herein, the vehicle interior detection sensor 50 is configured from a camera as an imaging unit, a weight sensor, temperature detection sensor, etc., and the types thereof are not particularly limited. It should be noted that the vehicle interior detection sensor 50 may be provided to every seat provided in the vehicle 1, or may be provided in a single configuration such that can overlook and monitor the entire vehicle interior.

Figure 2:
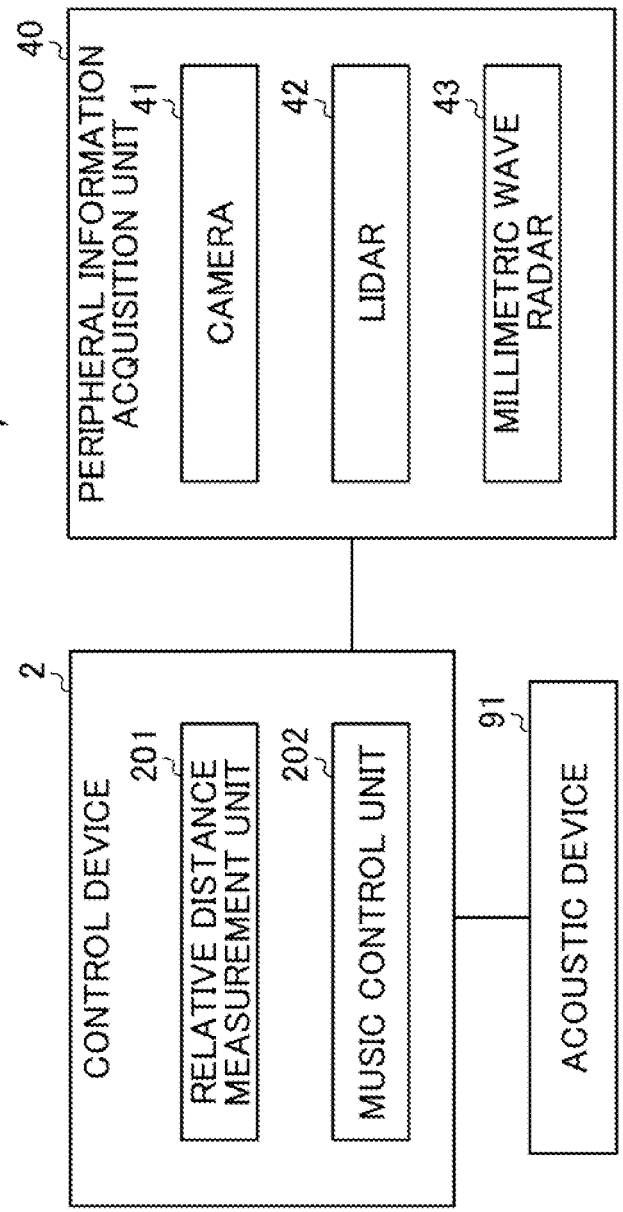
FIG. 2 is a view showing a functional configuration of a driving support device according to the present embodiment.

Hereinafter, processing of the driving support device 11 according to the present embodiment will be explained. FIG. 2 is a view showing a functional configuration of the driving support device 11 according to the present embodiment. As shown in FIG. 2, the driving support device 11 includes a control device 2, acoustic device 91 and outside-world information acquisition unit 40.

The control device 2 includes a relative distance measurement unit 201 and a music control unit 202. The acoustic device 91 is equipped to the vehicle 1 as mentioned above, is able to output music in response to an operation of an occupant of the vehicle 1. The outside-world information acquisition unit 40 includes the aforementioned camera 41, LIDAR 42 and millimetric wave radar 43.

The outside-world information acquisition unit 40 acquires outside-world information in the surroundings of the vehicle 1. The outside-world information is images of the surroundings of the vehicle 1 acquired by the camera 41, for example. In addition, the outside-world information, for example, may be data of the surroundings of the vehicle 1 acquired by the LIDAR 42 or millimetric wave radar 43.

The relative distance measurement unit 201 measures the relative distance between another vehicle traveling ahead of the vehicle 1 and the vehicle 1, based on the outside-world information acquired by the outside-world information acquisition unit 40.

The music control unit 202 controls music outputted by the acoustic device 91. The music control unit 202 modulates the tone of music according to the relative distance, in the case of the relative distance becoming no more than a first predetermined distance, in a state outputting music by the acoustic device 91.

For example, the modulation of music controlled by the music control unit 202 includes delaying music rhythm.

Next, the processing of the driving support device 11 according to the present embodiment will be explained while referencing FIGS. 3 to 6. FIGS. 3 to 6 are views showing the relationship of relative distance between the vehicle 1 and another vehicle 300. As shown in FIG. 3, the vehicle 1 is traveling ahead on a road A1, and the other vehicle 300 is traveling ahead of the vehicle 1, in the same lane as the vehicle 1.

In a state of not outputting music by the acoustic device 91 of the vehicle 1, the music control unit 202 automatically starts output of music to the acoustic device 91, in the case of the relative distance between the vehicle 1 and other vehicle 300 becomes no more than a second predetermined distance D2. Herein, the second predetermined distance D2 is a distance longer than the first predetermined distance D1.

Then, the music control unit 202 gradually increases the volume as approaching the first predetermined distance D1, after automatically starting output of music. It should be noted that, at this moment, the music control unit 202 increases the volume; however, the tone of music is not modulated. The occupant of the vehicle 1 can thereby be aware of the inter-vehicle distance from the other vehicle 300 started to narrow.

Figure 4:
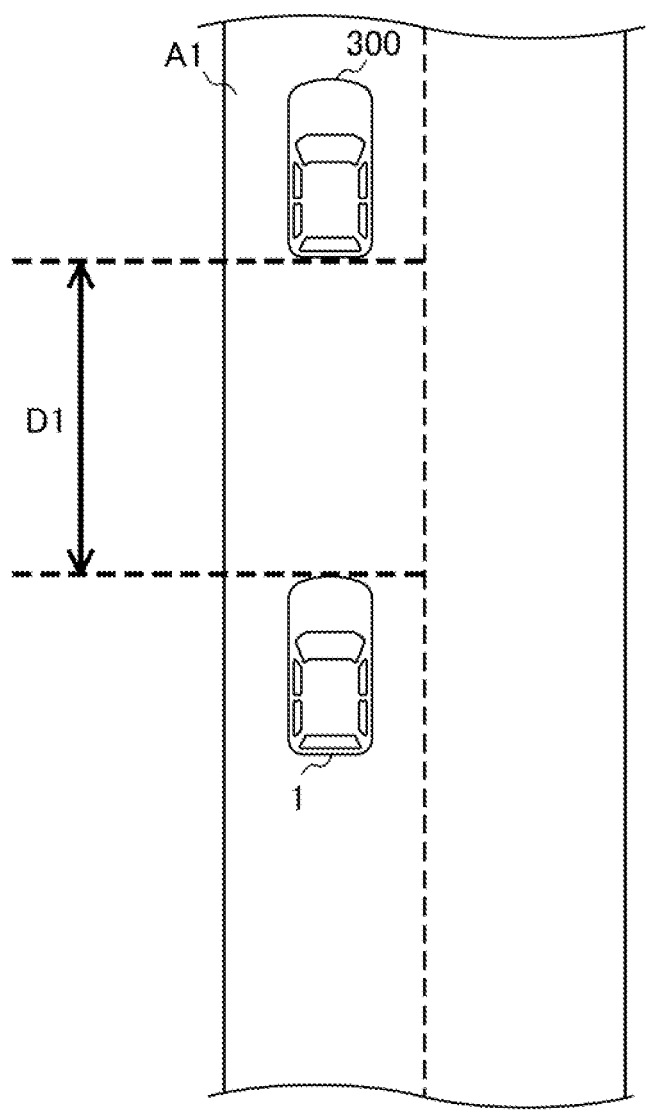
FIG. 4 is a view showing a relationship of relative distances between a vehicle and another vehicle.

Next, as shown in FIG. 4, in a state outputting music by the acoustic device 91, the music control unit 202 causes music to be outputted at the normal volume in the acoustic device 91, in the case of the relative distance between the vehicle 1 and other vehicle 300 exceeding the first predetermined distance D1. The occupant of the vehicle 1 can thereby be aware of the inter-vehicle distance from the other vehicle 300 being maintained.

Figure 5:
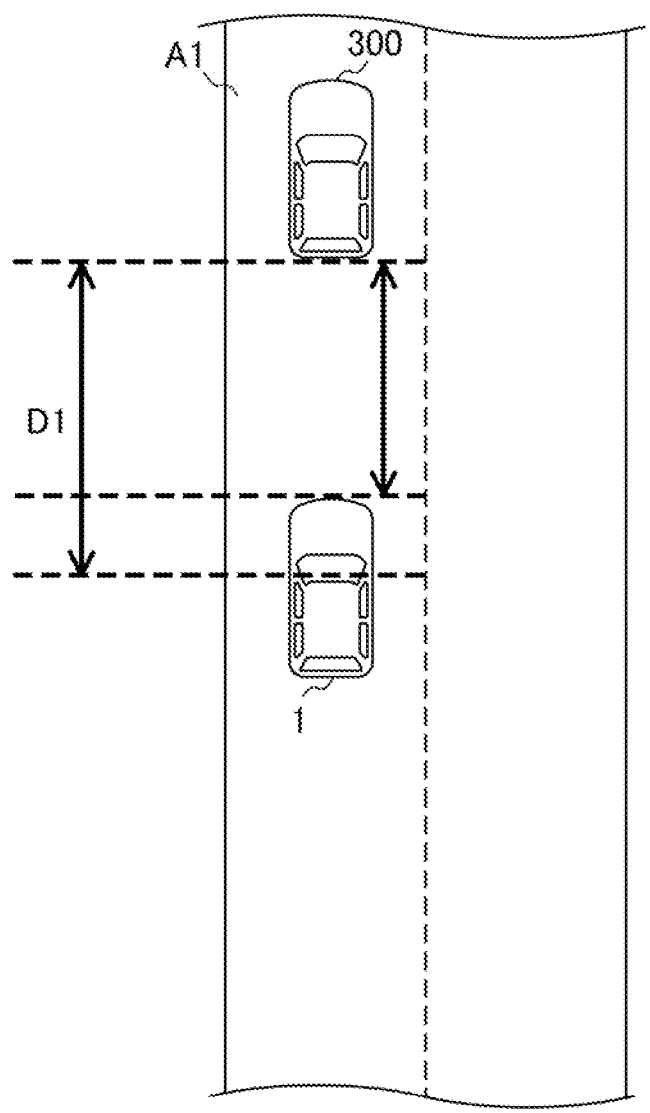
FIG. 5 is a view showing a relationship of relative distances between a vehicle and another vehicle.

Next, as shown in FIG. 5, in the state of outputting music by the acoustic device 91, the music control unit 202 delays the rhythm of music according to the relative distance, in the case of the relative distance between the vehicle 1 and other vehicle 300 becoming no more than the first predetermined distance D1.

Furthermore, the music control unit 202 delays the rhythm of music according to the relative distance, and causes the volume of music to decrease. More specifically, after the relative distance becomes no more than the first predetermined distance D1, the music control unit 202 gradually delays the rhythm of music as the relative distance shortens, and gradually causes the volume of music to decrease. The occupant of the vehicle 1 can thereby be aware of the inter-vehicle distance from the other vehicle 300 becoming closer.

Figure 6:
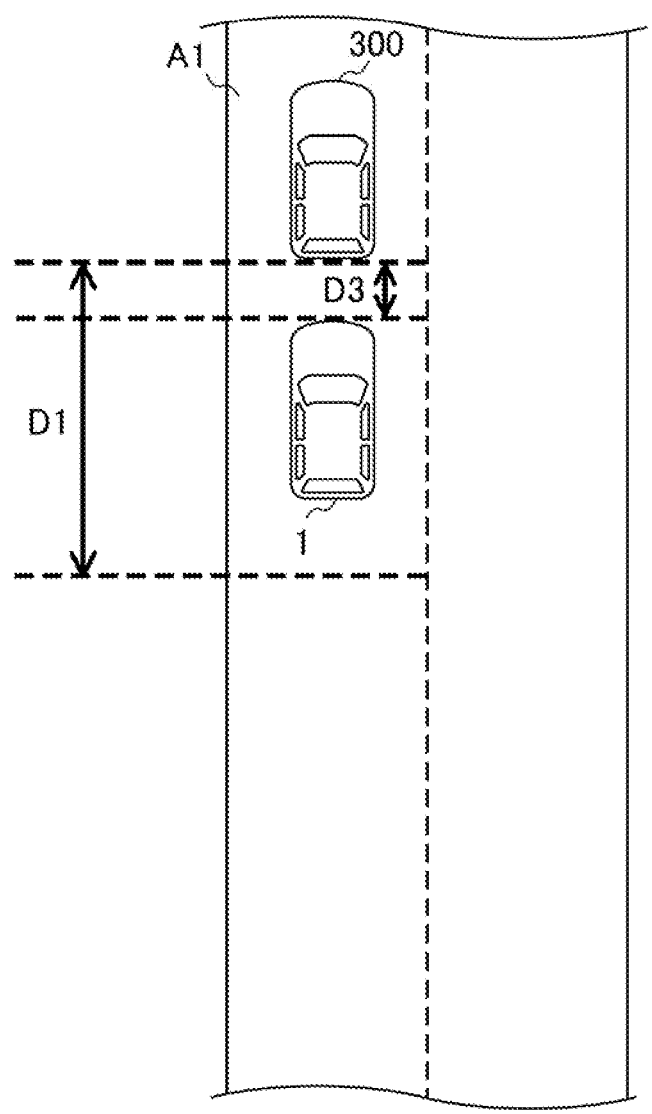
FIG. 6 is a view showing a relationship of relative distances between a vehicle and another vehicle.

Next, as shown in FIG. 6, in a state outputting music by the acoustic device 91, the music control unit 202 stops the output of music by the acoustic device 91, in the case of the relative distance becoming no more than a third predetermined distance D3, which is shorter than the first predetermined distance D1, and outputs a warning to the occupant by the acoustic device 91 and/or display device 92. The occupant of the vehicle 1 can thereby be aware of the inter-vehicle distance from the other vehicle 300 becoming very close, and there being a possibility of the vehicle 1 and other vehicle 300 colliding.

Figure 7:
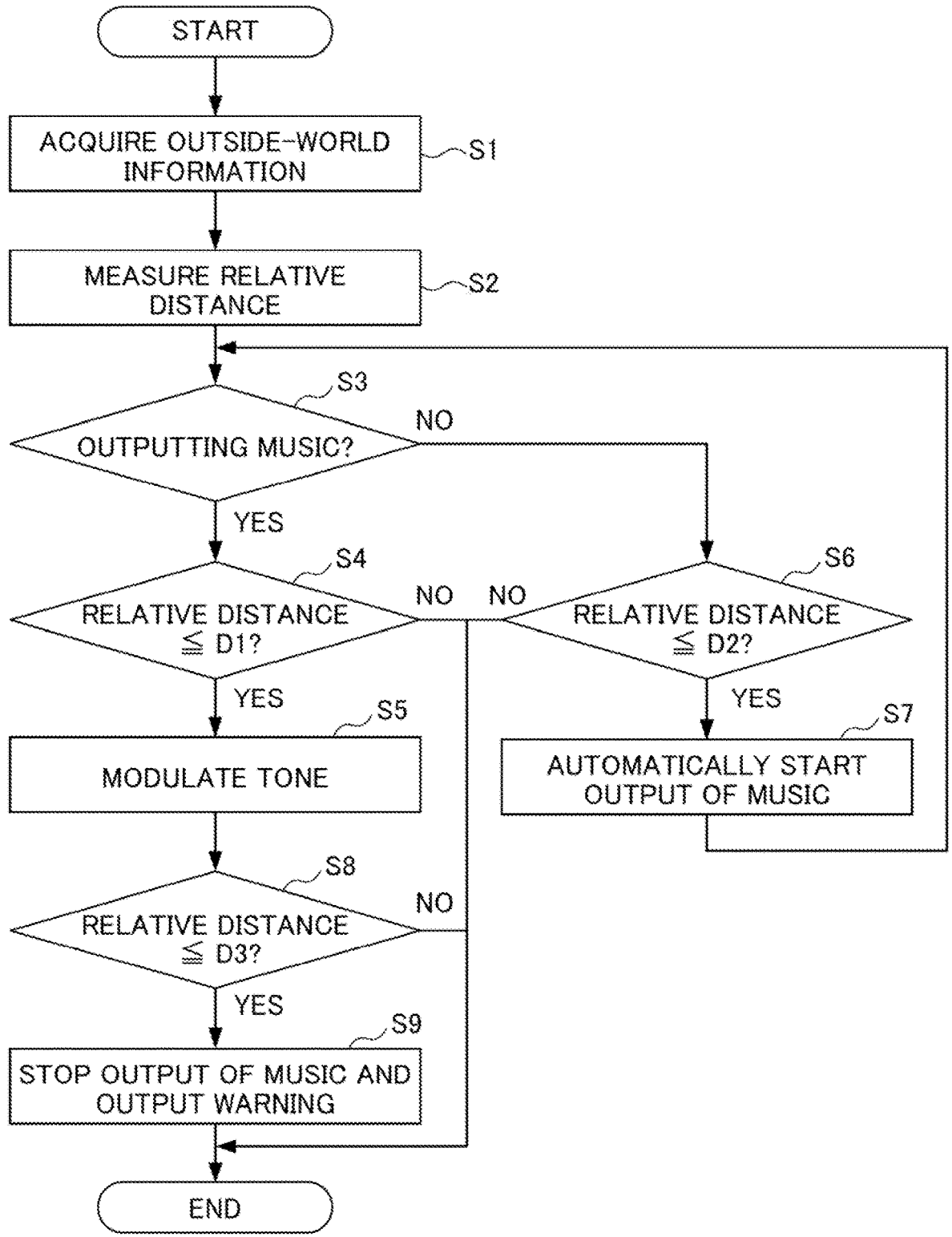
FIG. 7 is a flowchart showing processing of a driving support device according to the present embodiment.

FIG. 7 is a flowchart showing the processing of the driving support device 11 according to the present embodiment. In Step S1, the outside-world information acquisition unit 40 acquires outside-world information of the surroundings of the vehicle 1. In Step S2, the relative distance measurement unit 201 measures the relative distance between another vehicle traveling ahead of the vehicle 1 and the vehicle 1, based on the outside-world information acquired by the outside-world information acquisition unit 40.

In Step S3, the music control unit 202 determines whether music is being outputted by the acoustic device 91. In the case of outputting music (YES), the processing advances to Step S4. On the other hand, in the case of not outputting music (NO), the processing advances to Step S6.

In Step S4, the music control unit 202 determines whether the relative distance is no more than the first predetermined distance D1. In the case of the relative distance being no more than the first predetermined distance D1 (YES), the processing advances to Step S5. On the other hand, in the case of the relative distance exceeding the first predetermined distance D1 (NO), the music control unit 202 maintains the output of music, and the processing subsequently ends.

In Step S5, the music control unit 202 delays the rhythm of music according to the relative distance, in the case of the relative distance between the vehicle 1 and other vehicle 300 becoming no more than the first predetermined distance D1.

In Step S6, the music control unit 202 determines whether the relative distance is no more than the second predetermined distance D2. In the case of the relative distance being no more than the second predetermined distance D2 (YES), the processing advances to Step S7. On the other hand, in the case of the relative distance exceeding the second predetermined distance D2 (NO), the processing returns to Step S1.

In Step S7, the music control unit 202 gradually increases the volume as approaching the first predetermined distance D1, after automatically starting the output of music.

In Step S3, the music control unit 202 determines whether the relative distance is no more than a third predetermined distance D3. In the case of the relative distance being no more than the third predetermined distance D3 (YES), the processing advances to Step S9. On the other hand, in the case of the relative distance exceeding the third predetermined distance D3 (NO), the music control unit 202 maintains the output of music, and the processing subsequently ends.

In Step S9, the music control unit 202 stops the output of music by the acoustic device 91, in the case of the relative distance becoming no more than the third predetermined distance D3, and outputs a warning to the occupant by the acoustic device 91 and/or display device 92.

According to the present embodiment, the following effects are exerted, for example. The driving support device 11 includes: the acoustic device 91 equipped to the vehicle 1, and capable of outputting music according to an operation of the occupant of the vehicle 1; the outside-world information acquisition unit 40 which acquires outside-world information in the surroundings of the vehicle 1; the relative distance measurement unit 201 which measures the relative distance from the other vehicle 300 traveling ahead of the vehicle 1 based on the outside-world information acquired by the outside-world information acquisition unit 40; and the music control unit 202 which control music outputted by the acoustic device 91, in which the music control unit 202 modulates the tone of music according to the relative distance, in the case of the relative distance becoming no more than the first predetermined distance D1, in a state of outputting music by the acoustic device 91.

The occupant of the vehicle 1 will keep the inter-vehicle distance with the motivation of listening to music in a normal state. Consequently, the driving support device 11 can prompt voluntary adjustment of the inter-vehicle distance, in order to avoid collision between the vehicle 1 and other vehicle 300, by modulating the tone of music according to the relative distance, and can perform an effective warning to the occupant of the vehicle 1.

In addition, the modulation of music includes delaying the rhythm of music. In other words, the driving support device 11 delays the rhythm of music as approaching the other vehicle 300 traveling head, from the first predetermined distance D1 at which the distance required for stopping can be taken into account to travel by following. The driving support device 11 can thereby impart a slow impression to the occupant, and negate the sense of speed of the occupant, by delaying the rhythm of music. Then, the driving support device 11, when the relative distance (inter vehicle distance) subsequently separates, can cause the sense of speed of the occupant to increase, due to the rhythm of music increasing.

In addition, the music control unit 202, in a state of the music not being outputted by the acoustic device 91, in the case of the relative distance becoming no more than the second predetermined distance D2, causes the output of music to automatically start in the acoustic device 91, and causes the volume to increase as approaching the first predetermined distance D1. In addition, the second predetermined distance is longer than the first predetermined distance. The driving support device 11 can thereby allow the occupant to be aware of the inter-vehicle distance becoming shorter by the output of music and increase in volume.

In addition, the music control unit 202 causes the volume of music to decrease according to the relative distance, in the case of the relative distance becoming no more than the first predetermined distance D1. In this way, the driving support device 11 can thereby direct attention of the occupant to the other vehicle 300 traveling ahead without music, by causing the volume of music to decrease in the case of the relative distance becoming no more than the first predetermined distance D1.

In addition, the music control unit 202 stops the output of music by the acoustic device 91 in the case of the relative distance becoming no more than the third predetermined distance D3, which is shorter than the first predetermined distance D1, and outputs a warning to the occupant. The driving support device 11 can thereby perform warning to the occupant and avoid collision, in the case of being an inter-vehicle distance having a possibility of colliding between the vehicle 1 and other vehicle 300.

It should be noted that the driving support device 11 executes processing such as that shown above, only in the case of the speed of the vehicle 1 being a speed having a possibility of colliding with the other vehicle 300. In other words, the driving support device 11 does not execute processing such as that shown above, in the case of the speed of the vehicle 1 being less than a fixed speed not having a possibility of colliding with the other vehicle 300.

In addition, the music control unit 202, in the case of a voice for guidance such as of the navigation device being outputted by the acoustic device 91, causes only the output of music to change, and does not change the voice for guidance.

In addition, the control device 2 may modulate the tone of music using relative time, in place of the calculation of the relative distance by the relative distance measurement unit 201. Herein, the relative time indicates the time until the other vehicle 300 and vehicle 1 pass a predetermined point. However, the control device 2 may use the relative distance and relative speed, and calculate as a contact time until the vehicle 1 and other vehicle 300 make contact.

Although an embodiment of the present invention has been explained above, the above-mentioned driving support device 11 can be realized by hardware, software or a combination of these. In addition, the control method performed by the above-mentioned driving support device 11 can also be realized by hardware, software or a combination of these. Herein, realized by software indicates the matter of being realized by a computer reading out and executing a program.

The programs can be stored using a variety of types of non-transitory computer readable media, and supplied to the computer. The non-transitory computer readable media includes various types of tangible storage media. Examples of non-transitory computer readable media include magnetic media (for example, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)).

Although an embodiment of the present invention has been explained above, the present invention is not to be limited thereto. The configurations of detailed parts may be modified as appropriate within the scope of the gist of the present invention.

EXPLANATION OF REFERENCE NUMERALS

1 vehicle
11 driving support device
40 outside-world information acquisition unit
91 acoustic device
201 relative distance measurement unit
202 music control unit

What is claimed is:

1. A driving support device comprising:
    an acoustic unit equipped to a moving body, and which outputs music in response to an operation of an occupant of the moving body;
    an outside-world information acquisition unit which acquires outside-world information of surroundings of the moving body;
    a relative distance measurement unit which measures a relative distance from a front moving body traveling in front of the moving body, based on the outside-world information acquired by the outside-world information acquisition unit; and
    a music control unit which controls the music outputted by the acoustic unit,
    wherein the music control unit performs modulation of tone of the music according to the relative distance, if the relative distance becoming no more than a first predetermined distance, in a state of outputting music by the acoustic unit,
    wherein the music control unit
        delays rhythm of music as approaching the other vehicle traveling head, from a first predetermined distance, the first predetermined distance required for stopping the moving body is taken into account traveling by following, and
        when an inter vehicle distance subsequently separates, makes the rhythm of music faster.

2. The driving support device according to claim 1,
    wherein the music control unit, in a case of the relative distance becoming no more than a second predetermined distance, in a state of the music not being outputted by the acoustic unit, causes output of the music to start automatically in the acoustic unit, and causes volume to increase as approaching the first predetermined distance, and
    wherein the second predetermined distance is longer than the first predetermined distance.

3. The driving support device according to claim 1, wherein the music control unit causes volume of the music to decrease according to the relative distance, in a case of the relative distance becoming no more than the first predetermined distance.

4. The driving support device according to claim 3, wherein the music control unit stops output of the music by the acoustic unit in a case of the relative distance becoming no more than a third predetermined distance, which is shorter than the first predetermined distance, and outputs a warning to the occupant.

* * * * *